United States Patent
Lee et al.

(10) Patent No.: US 9,811,206 B2
(45) Date of Patent: Nov. 7, 2017

(54) TOUCH SENSING METHOD, TOUCH DISPLAY APPARATUS AND PORTABLE ELECTRONIC DEVICE

(71) Applicant: Industrial Technology Research Institute, Hsinchu (TW)

(72) Inventors: Chien-Ju Lee, Taoyuan (TW); Yen-Lin Pan, Kaohsiung (TW); Yi-Chuan Lu, Kinmen County (TW); Heng-Yin Chen, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 120 days.

(21) Appl. No.: 14/881,159

(22) Filed: Oct. 13, 2015

(65) Prior Publication Data

US 2016/0110020 A1 Apr. 21, 2016

Related U.S. Application Data

(60) Provisional application No. 62/066,381, filed on Oct. 21, 2014.

(30) Foreign Application Priority Data

Jun. 30, 2015 (TW) .............................. 104121264 A

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01); *G06F 3/0412* (2013.01)

(58) Field of Classification Search
CPC combination set(s) only.
See application file for complete search history.

(56) References Cited

U.S. PATENT DOCUMENTS

| 8,228,306 B2 | 7/2012 | Long et al. |
| 8,508,503 B2 | 8/2013 | Lin et al. |
| 8,704,798 B2 | 4/2014 | Chang |
| 8,723,835 B2 | 5/2014 | Chiu et al. |
| 8,736,573 B2 | 5/2014 | Byun et al. |

(Continued)

FOREIGN PATENT DOCUMENTS

| CN | 101739186 | 8/2013 |
| CN | 103677432 | 3/2014 |

(Continued)

OTHER PUBLICATIONS

"Office Action of Taiwan Counterpart Application", dated Jun. 27, 2016, p. 1-p. 4.

(Continued)

*Primary Examiner* — Robin Mishler
(74) *Attorney, Agent, or Firm* — JCIPRNET

(57) ABSTRACT

A touch sensing method, a touch display apparatus and a portable electronic device thereof are provided. A system, a driving method and an architecture of a provided touch display panel are used for decreasing a resistance value between the ultrathin touch display panel (for example, a combination of an AMOLED display panel and a touch panel) or decreasing an influence of the resistance value, so as to decrease a chance of induction error of the touch event or induction misjudgement.

7 Claims, 13 Drawing Sheets

(56) References Cited

U.S. PATENT DOCUMENTS

| | | | |
|---|---|---|---|
| 8,743,085 | B2 | 6/2014 | Liu et al. |
| 8,803,823 | B2 | 8/2014 | Chang et al. |
| 2011/0007030 | A1 | 1/2011 | Mo et al. |
| 2011/0063247 | A1 | 3/2011 | Min |
| 2011/0193817 | A1 | 8/2011 | Byun et al. |
| 2013/0076700 | A1* | 3/2013 | Chiu .................. G06F 3/0418 345/179 |
| 2013/0307814 | A1 | 11/2013 | Chang |
| 2014/0071360 | A1 | 3/2014 | Chang et al. |
| 2016/0357340 | A1* | 12/2016 | Ma ...................... G06F 3/0418 |

FOREIGN PATENT DOCUMENTS

| | | |
|---|---|---|
| TW | 201131451 | 9/2011 |
| TW | 201303687 | 1/2013 |
| TW | 201437896 | 10/2014 |

OTHER PUBLICATIONS

Hyoung-Rae Kim, et al., "A Mobile-Display-Driver IC Embedding a Capacitive-Touch-Screen Controller System," 2010 IEEE International Solid-State Circuits Conference Digest of Technical Papers (ISSCC), Feb. 7-11, 2010, pp. 114-115.

Jun-Hyeok Yang, et al., "A Highly Noise-Immune Touch Controller Using Filtered-Delta-Integration and a Charge-Interpolation Technique for 10.1-inch Capacitive Touch-Screen Panels," 2013 IEEE International Solid-State Circuits Conference Digest of Technical Papers (ISSCC), Feb. 17-21, 2013, pp. 390-391.

Ki-Duk Kim, et al., "A Fully-Differential Capacitive Touch Controller with Input Common-Mode Feedback for Symmetric Display Noise Cancellation," 2014 Symposium on VLSI Circuits Digest of Technical Papers, Jun. 10-13, 2014, pp. 1-2.

\* cited by examiner

TOUCH SENSING METHOD, TOUCH DISPLAY APPARATUS AND PORTABLE ELECTRONIC DEVICE

CROSS-REFERENCE TO RELATED APPLICATION

This application claims the priority benefits of U.S. provisional application Ser. No. 62/066,381, filed on Oct. 21, 2014 and Taiwan application serial no. 104121264, filed on Jun. 30, 2015. The entirety of each of the above-mentioned patent applications is hereby incorporated by reference herein and made a part of this specification.

BACKGROUND OF THE DISCLOSURE

Field of the Disclosure

The disclosure relates to a touch sensing method, a touch display apparatus and a portable electronic device.

Description of Related Art

In recent years, along with quick development of various applications such as information technology, wireless mobile communication and information home appliances, etc., in order to achieve purposes of more convenient, more compact volume and more user-friendly, input devices of many information products have been changed from conventional keyboards or mouses, etc. to touch display panels. Regarding the commonly used touch display panels, touch panels and display panels are separately manufactured first, and then the touch panels and the display panels are assembled.

In order to achieve a purpose of lightness, slimness, shortness and smallness, in a plurality of display panel applications, since an active matrix organic light emitting diodes (AMOLED) display panel has characteristics of light weight, low power consumption, prior optical properties and low cost, etc., it has become a mainstream in the market. In touch display panel designs today, according to design principles of touch sensing modes, touch display panels mainly include resistive, capacitive, optical, acoustic and electromagnetic touch display panels, in which the resistive and capacitive touch display panels are most popular.

Regarding an on-cell touch display panel, a driving electrode and a sensing electrode of the touch panel are disposed over the display panel. When the user performs a touch operation by a finger, it is easy to have a poor induction, particularly when a thickness of the touch display panel (a combination of the AMOLED display panel and the touch panel) becomes thinner, for example, to be in a level lower than 100 micrometer (μm), such kind of poor induction often occurs, which is a problem required to be resolved.

SUMMARY OF THE DISCLOSURE

An exemplary embodiment of the disclosure provides a touch sensing method, which is adapted to a touch display apparatus. The touch display apparatus includes a display panel and a touch panel, the display panel includes an electrode layer, and the touch panel includes a driving electrode layer. In the method, a voltage is applied to the driving electrode layer, and a system parameter is set to determine whether an induction event is occurred, and if not, a sensing voltage is obtained, and if yes, a parasitic capacitance voltage corresponding to the induction event is obtained. It is determined whether a value obtained by subtracting the sensing voltage from the parasitic capacitance voltage is smaller than a threshold voltage, if yes, the system parameter is adjusted, and it is deter mined whether a next induction event is occurred according to the updated system parameter, and if not, it is determined whether a variation of the sensing voltage is smaller than a threshold, if not, a touch point is reported, and if yes, the system parameter is adjusted, and it is determined whether a next induction event is occurred according to the updated system parameter.

An exemplary embodiment of the disclosure provides a touch display apparatus, which is adapted to execute the aforementioned touch sensing method, where the touch display apparatus includes a display panel and a touch panel. The display panel includes an electrode layer. The touch panel includes a driving electrode layer.

An exemplary embodiment of the disclosure provides a touch sensing method, which is adapted to a touch display apparatus. The touch display apparatus includes a display panel and a touch panel, the display panel includes an electrode layer, and the touch panel includes a driving electrode layer. The touch sensing method includes following steps. A first voltage is applied to the driving electrode layer and a second voltage is applied to the electrode layer during an induction driving period, where the second voltage is greater than or equal to the first voltage. An induction event of the driving electrode layer is read during the induction driving period, and a sensing voltage is generated corresponding to the induction event. It is determined whether the sensing voltage is greater than a threshold, and if yes, a touch point is reported.

An exemplary embodiment of the disclosure provides a portable electronic device including a touch display apparatus and at least one equipotential electrode, where the touch display apparatus includes a display panel and a touch panel. The display panel includes an electrode layer, the touch panel includes a driving electrode layer, and a voltage level of the at least one equipotential electrode is equal to or smaller than a voltage level of the electrode layer of the display panel during an induction driving period.

An exemplary embodiment of the disclosure provides a touch sensing method, which is adapted to a portable electrode device. The portable electronic device includes a back plate and a main body in which a touch display apparatus is configured, where the touch display apparatus includes a display panel and a touch panel. The display panel includes an electrode layer, the touch panel includes a driving electrode layer, and the back plate is configured with a plurality of equipotential electrodes. The touch sensing method include following steps. During an induction driving period, a signal with a first voltage is applied to the electrode layer of the display panel and a signal with a second voltage is applied to the equipotential electrodes, where the first voltage is greater than or equal to the second voltage. An induction event of the driving electrode layer is read, a sensing voltage corresponding to the induction event is generated. It is determined whether the sensing voltage is greater than a threshold, and if yes, a touch point is reported.

In order to make the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

The disclosure provides a system, a driving method and architecture adapted to a touch display panel, and particularly adapted to an ultrathin touch display panel.

Figure 1A:
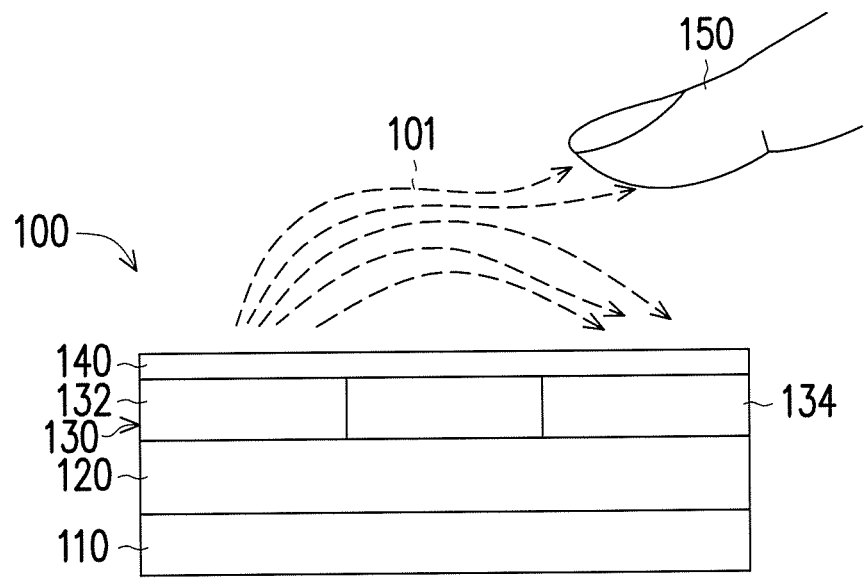
FIG. 1A and FIG. 1B are schematic diagrams of an induced electric field generated when a user touches a touch display panel by a finger.
Figure 1B:
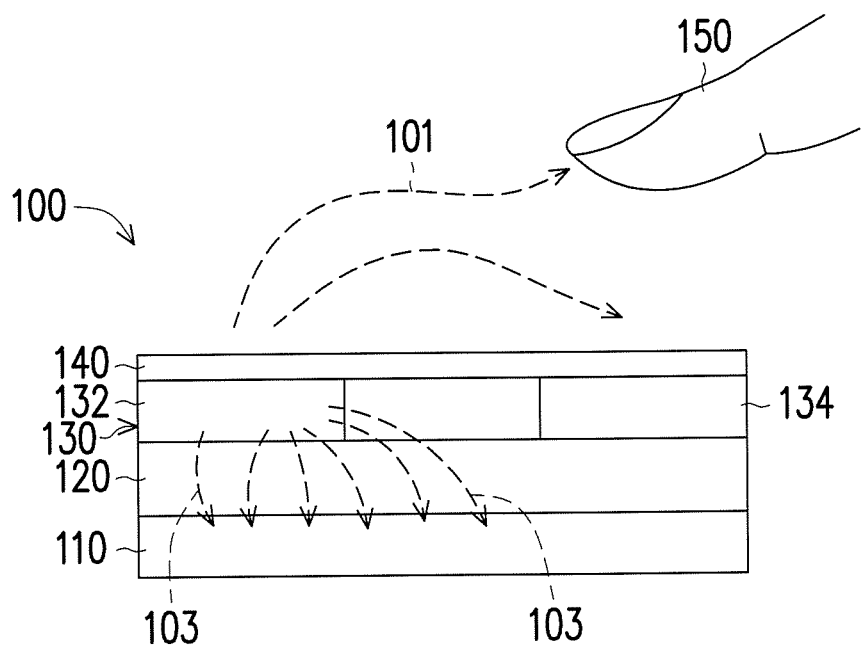

Referring to FIG. 1A and FIG. 1B, FIG. 1A and FIG. 1B are schematic diagrams of an induced electric field generated when the user touches the touch display panel by the finger. The touch display panel 100, for example, includes an active matrix organic light emitting diodes (AMOLED) display panel and a touch panel, and, in the embodiment shown in FIG. 1A and FIG. 1B, part of the touch display panel 100, for example, an upper electrode 110 of the AMOLED display panel, an electrode layer 130 including a transmitting electrode (TX) 132 and a receiving electrode (RX) 134, an insulation layer 120 located between the upper electrode 110 and the electrode layer 130 and a cover layer 140 located on the electrode layer 130 are illustrated.

In the exemplary embodiment, the upper electrode 110 of the AMOLED display panel can be a cathode of an AMOLED. In the exemplary embodiment, the insulation layer 120 can be an organic layer or an inorganic layer. When the insulation layer 120 is the organic layer, the organic layer is, for example, a pressure sensitive adhesive (PSA) layer or a water gel. On the other hand, the cover layer 140 can also be an organic layer or an inorganic layer. When the cover layer 140 is the organic layer, a material of the cover layer 140 is, for example, polyimide (PI) or polyethylene terephthalate (PET). When the cover layer 140 is the inorganic layer, the material of the cover layer 140 is, for example, thin glass. Moreover, regarding a layout of the electrode layer 130 of the touch panel, the transmitting electrodes (TX) 132 and the receiving electrodes (RX) 134 arranged in alternation are adopted in the exemplary embodiment, though the disclosure is not limited thereto, and an upper and lower stacking layout can also be adopted.

When the user performs the touch operation by a finger 150, misjudgement of a touch event is usually occurred due to an excessively short induction time. Here, the misjudgement of the touch event may, in one embodiment, mean that touch display panel 100 fails to correctly judge the operation by the finger of the user whether the user tries to trigger the touch event or not. Generally, when the finger 150 touches a surface of the touch display panel 100, an electric field between the transmitting electrode (TX) 132 and the receiving electrode (RX) 134 may have a variation, for example, an induced electric field 101 shown in FIG. 1A. However, when a thickness of the touch display panel (for example, a combination of the AMOLED display panel and the touch panel) becomes more and more thinner to an ultra-thin thickness in a range lower than 100 micrometer (μm), an influence of the upper electrode 110 of the AMOLED display panel on the induced electric field becomes more obvious, and one of the reasons that causes reduction of the induction time is that an impedance of the finger 150 is greater than that of a ground electrode. When the finger 150 touches the surface of the touch panel, the variation of the induced electric field 103 is led out by the upper electrode 110 of the AMOLED display panel.

Figure 1C:
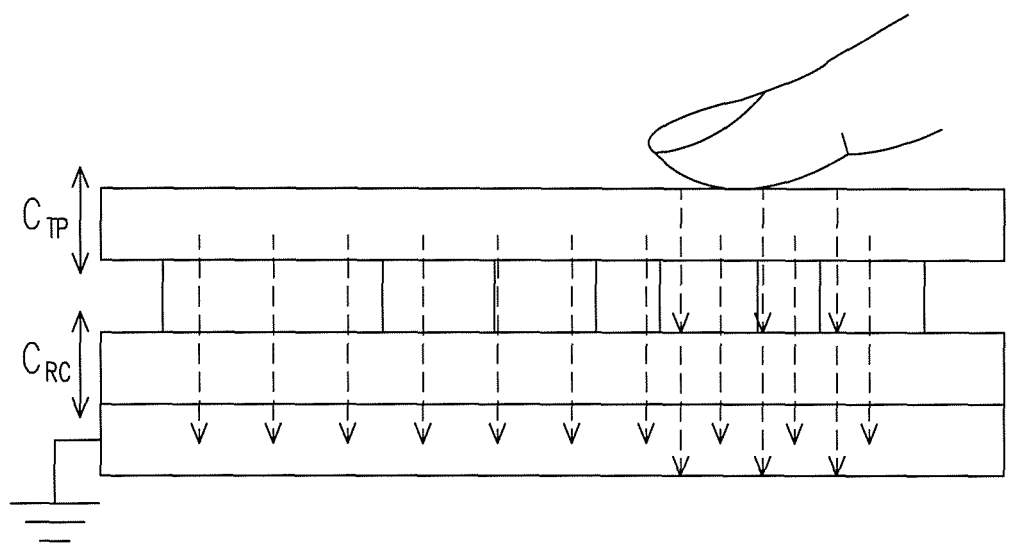
FIG. 1C and FIG. 1D are schematic diagrams illustrating a capacitor formed between a capacitive touch panel and a display panel, and an induced electric field generated when the touch display panel is touched.
Figure 1D:
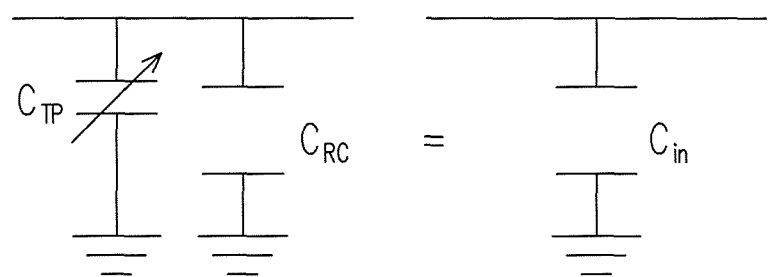

Another reason that causes the excessively short induction time to result in misjudgement of the touch event is that a mutual capacitance becomes larger to form an electrostatic field when the thickness of the touch display panel becomes thinner. Referring to FIG. 1C and FIG. 1D, FIG. 1C and FIG. 1D are schematic diagrams illustrating a capacitance formed between a capacitive touch panel and a display panel (for example, the AMOLED), and an induced electric field generated when the touch display panel is touched. As shown in FIG. 1C, a capacitor $C_{TP}$ is formed between the sensing electrode and the driving electrode, and another capacitor $C_{RC}$ is formed between the sensing electrode and the upper electrode of the display panel (for example, the AMOLED). To be specific, $C_{RC}$ is a parasitic capacitor. When the finger touches the surface of the touch panel, an induced electric field is respectively generated at the two capacitors $C_{TP}$ and $C_{RC}$, i.e., a part of the induced electric field is led to the upper electrode of the display panel. As shown in FIG. 1D, regarding an input electric property of the induced electric field, an equivalent capacitance of the panel is a parallel value $C_{in}$ of the two capacitors $C_{TP}$ and $C_{RC}$.

The system, driving method and architecture of the touch display panel provided by the exemplary embodiment of the disclosure are used for decreasing a resistance value between the ultrathin touch display panel (for example, a combination of the AMOLED display panel and the touch panel) or decreasing the influence of the resistance value, so as to decrease a chance of induction error of the touch event or induction misjudgement. In the ultrathin touch display panel of the exemplary embodiment of the disclosure, an attaching thickness of the display panel and the touch panel can be in a level lower than 100 μm, or even reaches a level of 2 to 100 μm.

Figure 2:
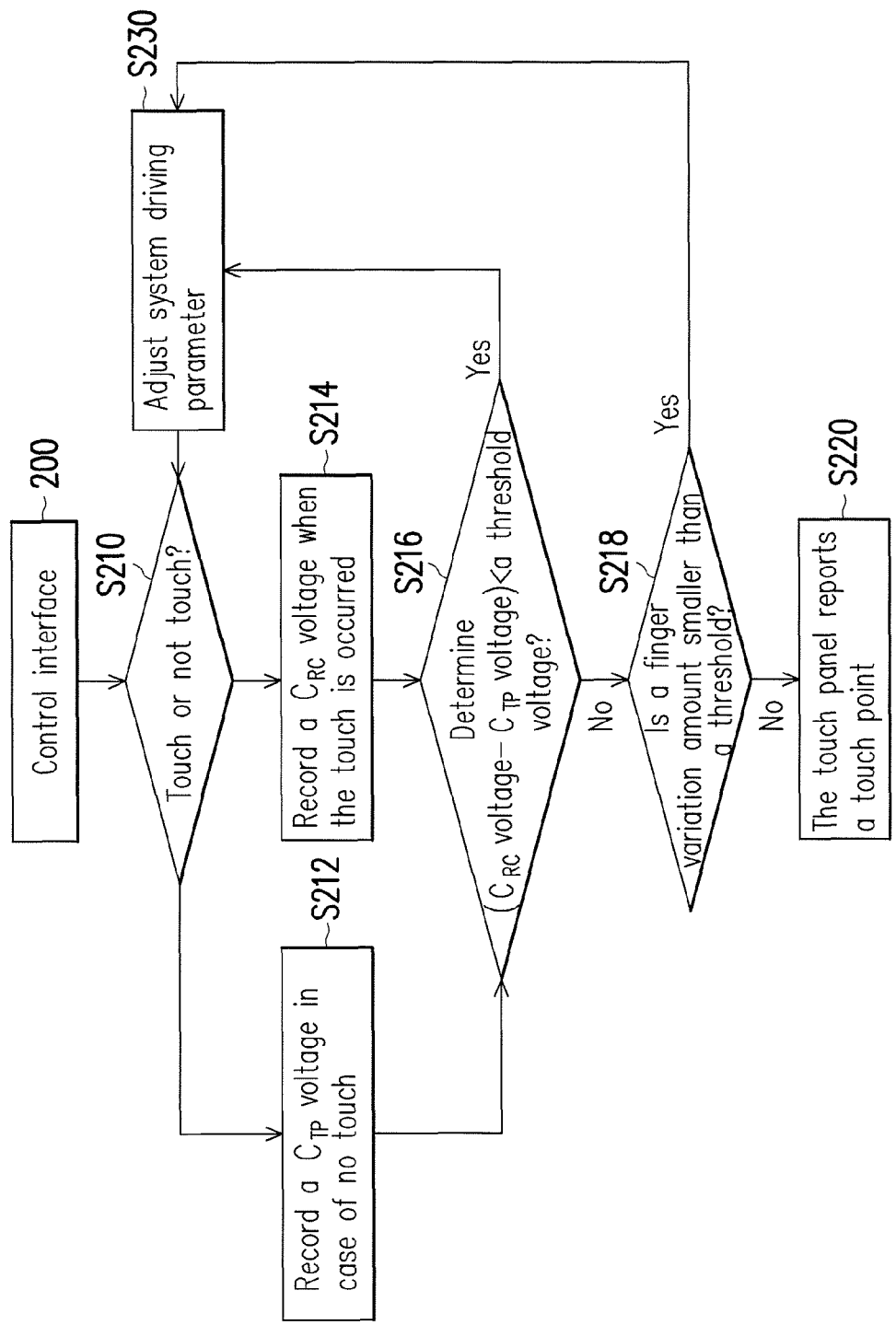
FIG. 2 is a flowchart illustrating a driving method of an ultrathin touch display panel used for obtaining a reported touch point of a touch panel according to an embodiment of the disclosure.

A driving method of the touch display panel of the disclosure is described below with reference of FIG. 2. FIG. 2 is a flowchart illustrating a driving method of the ultrathin touch display panel (for example, a combination of the AMOLED display panel and the touch panel) used for obtaining a reported touch point of the touch panel according to an embodiment of the disclosure. First, on a control interface 200, a step S210 is executed to determine whether a touch operation is performed or not. In the exemplary embodiment, the touch or no touch refers to whether an induction event is occurred, and the induction event refers to a variation detected on the touch panel, and the touch panel may adopt a capacitive or other type of touch panel. The touch panel can detect a touch event performed by an object (for example, an object made of a conductive material that is capable of influencing a capacitance of a circuit) or user's hand. For example, the induction event is a touch event. If it is determined that none touch operation is performed, for example, after performing regular detections by a predetermined period of time to determine that none touch operation is performed, a cross-voltage value of the capacitor $C_{TP}$ formed between the sensing electrode and the driving electrode is obtained and recorded (step S212). If it is determined that the touch operation is performed, a cross-voltage value of the other capacitor $C_{RC}$ formed between the sensing electrode and the upper electrode of the display panel (for example, the AMOLED) is obtained and recorded (step S214).

Then, in step S216, a difference between the cross-voltage values of the capacitor $C_{TP}$ and the capacitor $C_{RC}$ is determined according to the obtained cross-voltage values of the capacitor $C_{TP}$ and the capacitor $C_{RC}$, and when the cross-voltage value of the capacitor $C_{RC}$ minus the cross-voltage value of the capacitor $C_{TP}$ is smaller than a predetermined threshold voltage, it represents that the capacitor $C_{RC}$ formed between the sensing electrode and the display panel produce an influence, which probably results in an induction error of the touch event or an induction misjudgement. Therefore, in step S230 of an exemplary embodiment of the disclosure, a system driving parameter is adjusted, and a method for adjusting the system driving parameter is, for example, to dynamically prolong an induction time, etc. If the cross-voltage value of the capacitor $C_{RC}$ minus the cross-voltage value of the capacitor $C_{TP}$ is not smaller than the predetermined threshold voltage, in step S218, it is determined whether a variation amount of the finger is smaller than a threshold, for example, whether a variation of the cross-voltage value (i.e., the sensing voltage) of capacitor $C_{TP}$ framed between the sensing electrode and the driving electrode is smaller than a threshold, and if yes, in the step S230 of an exemplary embodiment of the disclosure, the system driving parameter is adjusted. The threshold can be an inbuilt predetermined value originally set in the touch panel, or a setting value adjusted according to an actual design. If the variation of the sensing voltage is greater than the threshold, a valid touch is determined, and the touch panel reports a touch point.

Figure 3A:
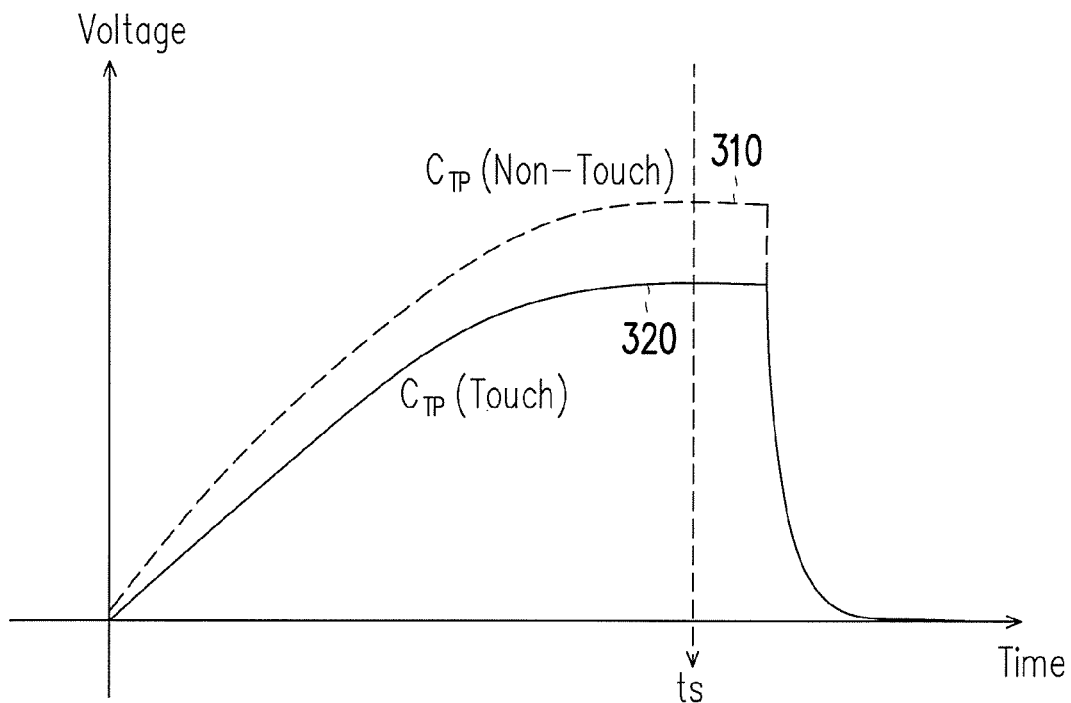
FIG. 3A to FIG. 3C are schematic diagrams illustrating voltage-time variations before and after an induction time of a touch panel is adjusted in order to adjust a system driving parameter.
Figure 3B:
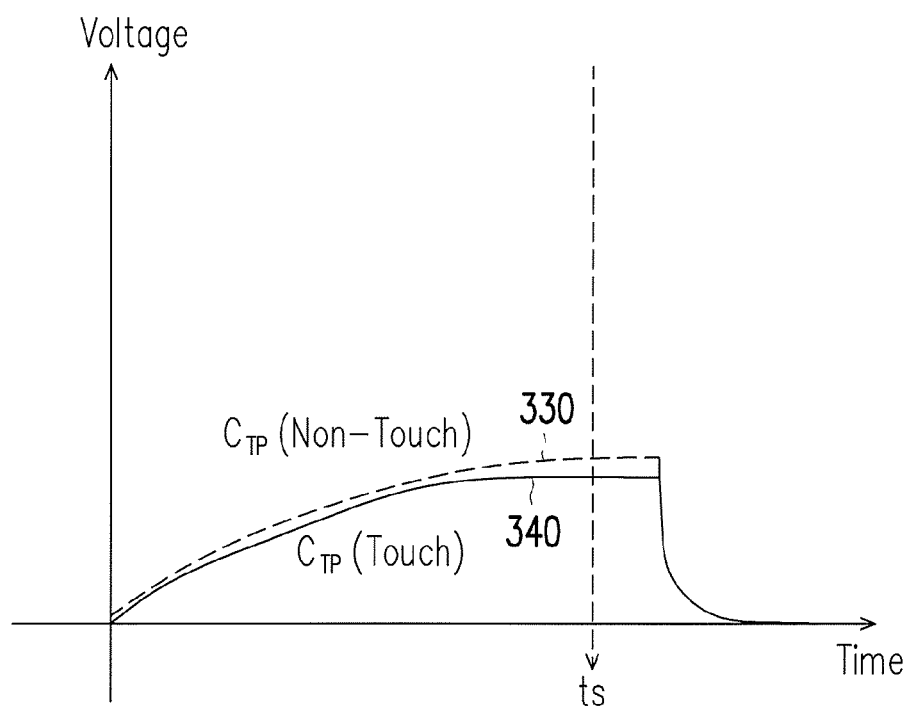
Figure 3C:
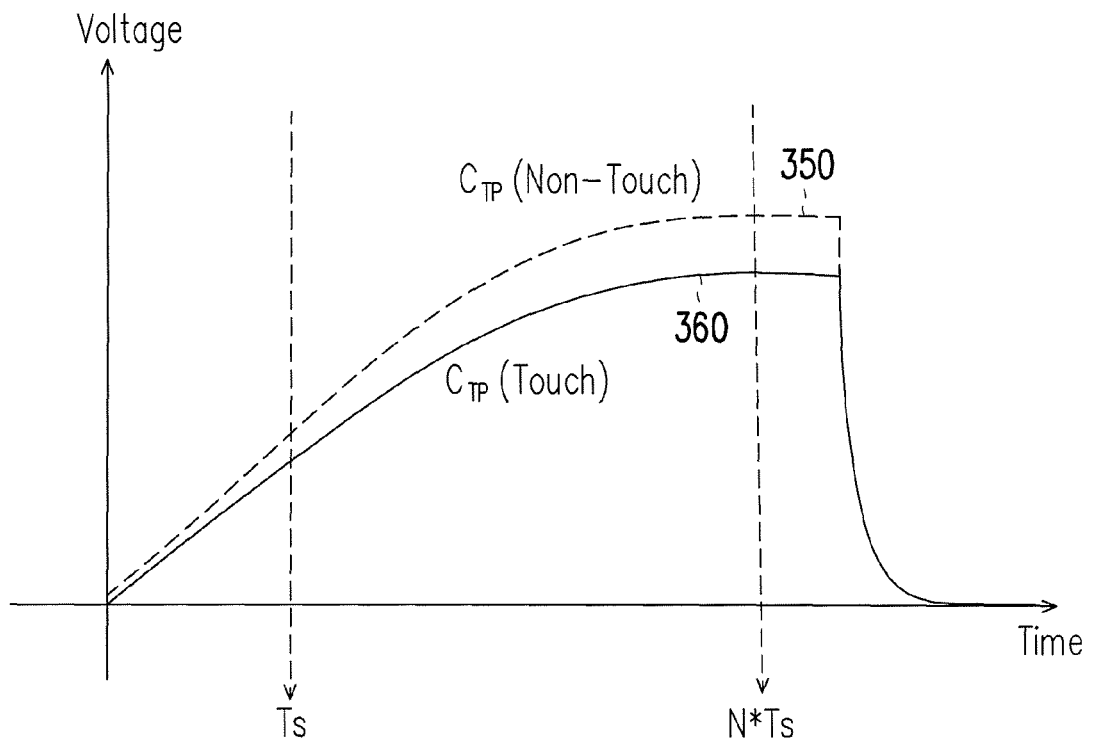

The adjustment of the system driving parameter in the exemplary embodiment of the disclosure includes adjustment of the induction time of the touch panel. Referring to FIG. 3A to FIG. 3C, FIG. 3A to FIG. 3C are schematic diagrams illustrating voltage-time variations before and after the induction time of the touch panel is adjusted in order to adjust the system driving parameter. Referring to FIG. 3A, FIG. 3A is a schematic diagram of a voltage-time variation obtained based on whether the induction event of the touch panel is generated in case that the touch event is not influenced by the display panel of the touch display panel under a general design. When none induction event is occurred, the cross-voltage value of the capacitor $C_{TP}$ between the sensing electrode and the driving electrode is shown as a dash line 310, which is represented by $C_{TP(Non-Touch)}$. When an induction event is occurred, the cross-voltage value of the capacitor $C_{TP}$ is shown as a solid line 320, which is represented by $C_{TP(Touch)}$. Generally, at a time point of the induction time ts, the touch panel performs induction to read the cross-voltage value and read the induction time.

Referring to FIG. 3B, FIG. 3B is a schematic diagram of a voltage-time variation obtained based on whether an induction event of the touch panel is generated in case that the touch display panel (for example, a combination of the AMOLED display panel and the touch panel) is designed to be more and more thinner. Since the touch display panel is designed to be more and more thinner, the capacitor $C_{RC}$ is formed between the sensing electrode and the upper electrode of the display panel, and regarding the operation in the induction driving period, the equivalent capacitance of the panel is the parallel value $C_{in}$ of the two capacitors $C_{TP}$ and $C_{RC}$. Therefore, due to that a part of the induced electric field is led out by the upper electrode of the display panel, the sensed voltage-time variation is lower than the cross-voltage value of the capacitor $C_{TP}$ of FIG. 3A under the same time.

Referring to FIG. 3B, the cross-voltage value of the capacitor $C_{TP}$ between the sensing electrode and the driving electrode is shown as a dash line 330 when none induction event is occurred, which is represented by $C_{TP(Non-Touch)}$. When the induction event is occurred, the cross-voltage value of the capacitor $C_{TP}$ is shown as a solid line 340, which is represented by $C_{TP(Touch)}$. For example, at the time point of the induction time ts, a difference between the cross-voltage value of the capacitor $C_{TP}$ corresponding to none induction event and the cross-voltage value of the capacitor $C_{TP}$ corresponding to the induction event is very small, so that it is liable to have a problem of induction error or induction misjudgement.

Referring to FIG. 3C, FIG. 3C is a schematic diagram of a voltage-time variation obtained based on whether an induction event of the touch panel is generated after a system driving parameter is adjusted according to an exemplary embodiment of the disclosure. In the exemplary embodiment, a method for adjusting the system driving parameter is to prolong the time point of the original induction time Ts by N times longer, i.e., a time point N times the induction time Ts (a time point N*Ts). The cross-voltage value of the capacitor $C_{TP}$ between the sensing electrode and the driving electrode is shown as a dash line 350 when none induction event is occurred, which is represented by $C_{TP(Non-Touch)}$. When the induction event is occurred, the cross-voltage value of the capacitor $C_{TP}$ is shown as a solid line 360, which is represented by $C_{TP(Touch)}$. According to FIG. 3C, it is clearly known that at the time point N*Ts, a difference between the cross-voltage value $C_{TP(Touch)}$ and the cross-voltage value $C_{TP(Non-Touch)}$ is increased by a lot compared with the difference at the induction time Ts. According to such design, the problem of induction error and induction misjudgement is mitigated.

In the exemplary embodiment of the disclosure, by adjusting the induction time of the touch panel to adjust the system driving parameter is adapted to various touch panel driving architectures. Several applicable touch panel driving architectures are introduced below, though the disclosure is not limited thereto.

Figure 4:
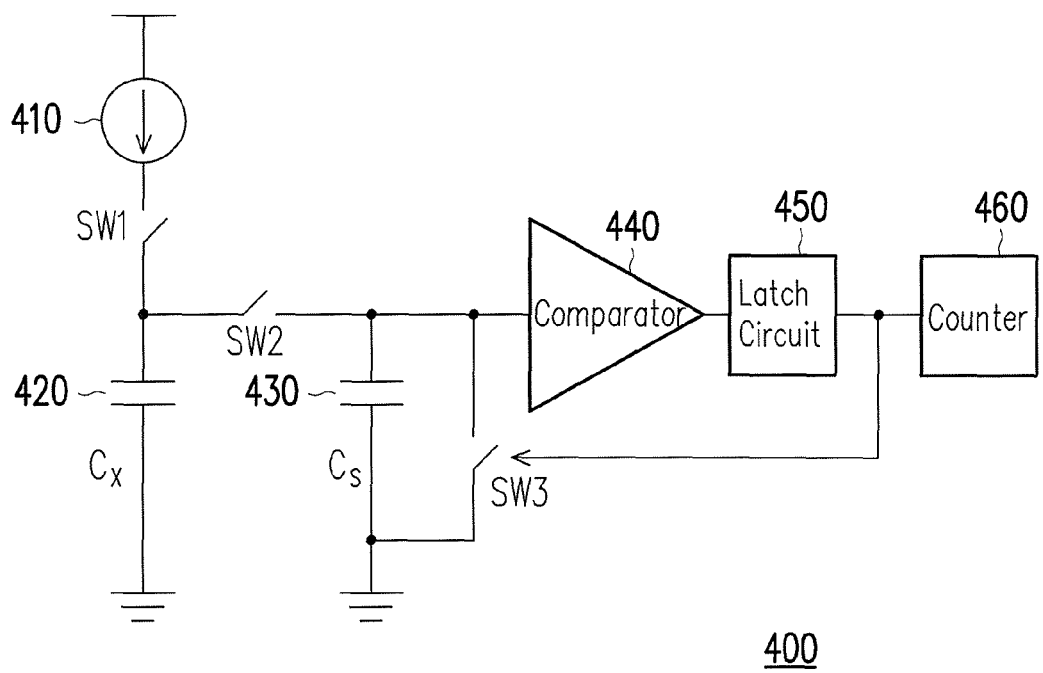
FIG. 4 is a schematic diagram of a charge transfer architecture circuit for adjusting a system driving parameter of the touch panel according to an exemplary embodiment of the disclosure.

Referring to FIG. 4, FIG. 4 is a schematic diagram of a charge transfer architecture circuit for adjusting the system driving parameter of the touch panel according to an exemplary embodiment of the disclosure. The charge transfer architecture circuit 400 includes a charge pump 410, a capacitor sensor (Cx) 420, a reference sampling capacitor (Cs) 430, a comparator 440, a latch 450, a counter 460 and a plurality of switches SW1-SW3. The single-end charge transfer capacitor sensor 420 adopts one electrode plate at each sensing channel, though it does not rely on timing measurements or an amplifier, but adopts a complementary metal oxide semiconductor (CMOS) switch (for example, the switch SW1) to pump the charges into the capacitor sensor 420 (for example, the capacitor sensor Cx shown in FIG. 4), and transfer the charges to the reference sampling capacitor (Cs) 430. By calculating the number of periods required for the reference sampling capacitor (Cs) 430 to reach a predetermined voltage value, it is easy to obtain a voltage level, and the number of the periods is inversely proportional to the capacitor sensor (Cx) 420. The charge transfer method avails suppressing an influence of current leakage, and since the exemplary embodiment of the disclosure adopts a very large reference sampling capacitor (Cx) 430 to serve as a detector, such detector is equivalent to a low impedance for external, so that it has a strong capability for resisting external electrical noises. In the exemplary embodiment of the disclosure, the adjustment of the system driving parameter is applied to the charge transfer architecture circuit to adjust the number of the periods required for reaching the predetermined voltage value.

Figure 5:
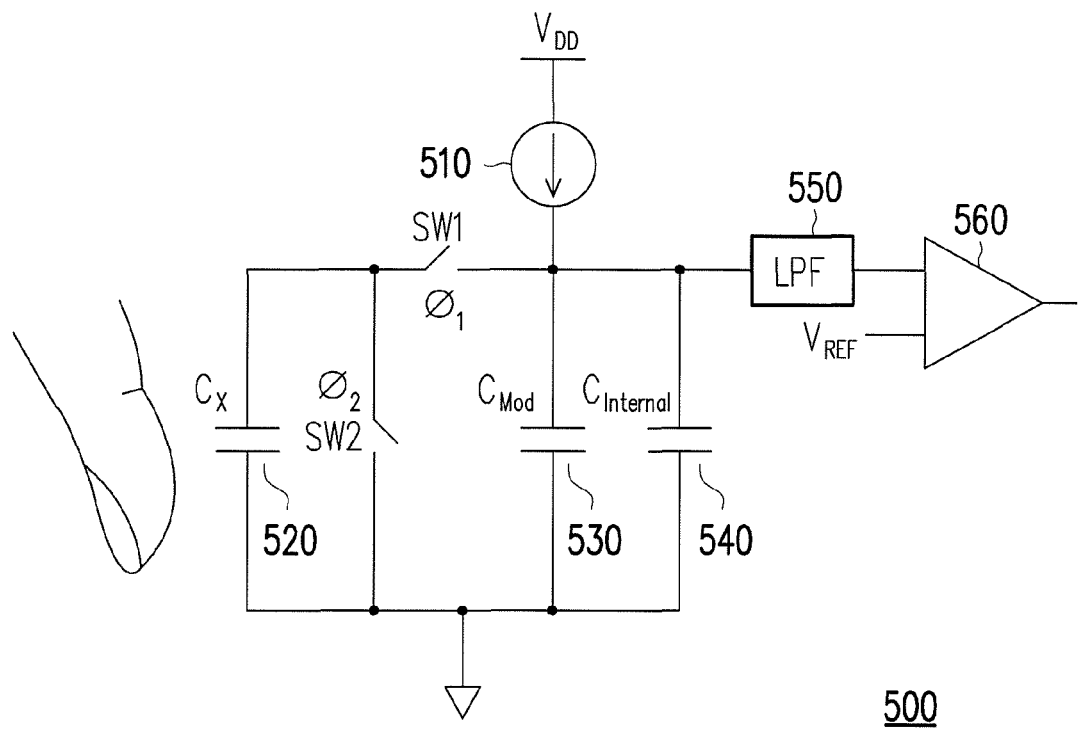
FIG. 5 is a schematic diagram of a constant current charge-discharge circuit for adjusting a system driving parameter of a touch panel according to an exemplary embodiment of the disclosure.

Referring to FIG. 5, FIG. 5 is a schematic diagram of a constant current charge-discharge circuit for adjusting the system driving parameter of the touch panel according to an exemplary embodiment of the disclosure. The constant current charge-discharge circuit 500 uses a CapSense successive approximation (CSA) technique. The constant current charge-discharge circuit 500 includes a constant current source 510, a capacitor sensor 520 (for example, the capacitor Cx shown in FIG. 5), a selective external modification capacitor ($C_{Mod}$) 530, an internal capacitor ($C_{Internal}$) 540, a low pass filter 550, a comparator 560 and switches SW1 and SW2. The capacitor sensor (Cx) 520 is connected in parallel with the selective external modification capacitor ($C_{Mod}$) 530 and the internal capacitor ($C_{Internal}$) 540 through an internal analog bus.

In the CSA design, the anti-interference capability is expressed in two aspects, and in one aspect, a switch capacitor circuit is adopted in collaboration with an external modulation capacitor to construct a low-impedance path, and a noise on the capacitor sensor (Cx) 520 has been greatly attenuated before reaching a modulator due to the low-impedance path. Moreover, the CSA technique is divided into three phases, and in phase 1, the capacitor sensor (Cx) 520 is connected to the internal analog bus to complete initialization, such that the external modification capacitor ($C_{Mod}$) 530 is recovered to an initial voltage ($V_{Start}$) through the switches SW1 and SW2. Phase 2 is a scan phase, in which the switches SW1 and SW2 are partially turned off, the constant current source 510 charges the external modification capacitor ($C_{Mod}$) 530, and the counter starts to count until the voltage of the external modification capacitor ($C_{Mod}$) 530 reaches a reference voltage ($V_{REF}$) of the comparator 560. Then, turn-over is occurred, and the counting is ended.

In phase 3, the scan is ended, and a firmware of the circuit processes the data of the counter. One scan is completed after the above three phases are ended, and a next scan is executed. The capacitor sensor (Cx) 520 is connected to the internal analog bus in the phase 1, and is disconnected thereto in the real measuring and counting phase, i.e., the phase 2 and the phase 3, such that the noise on the capacitor sensor (Cx) 520 does not influence the counting, and the anti-interference capability is greatly enhanced. In the exemplary embodiment of the disclosure, the adjustment of the system driving parameter is applied to the CSA design for adjusting the time of the phase 1, so as to adjust the induction time.

Figure 6:
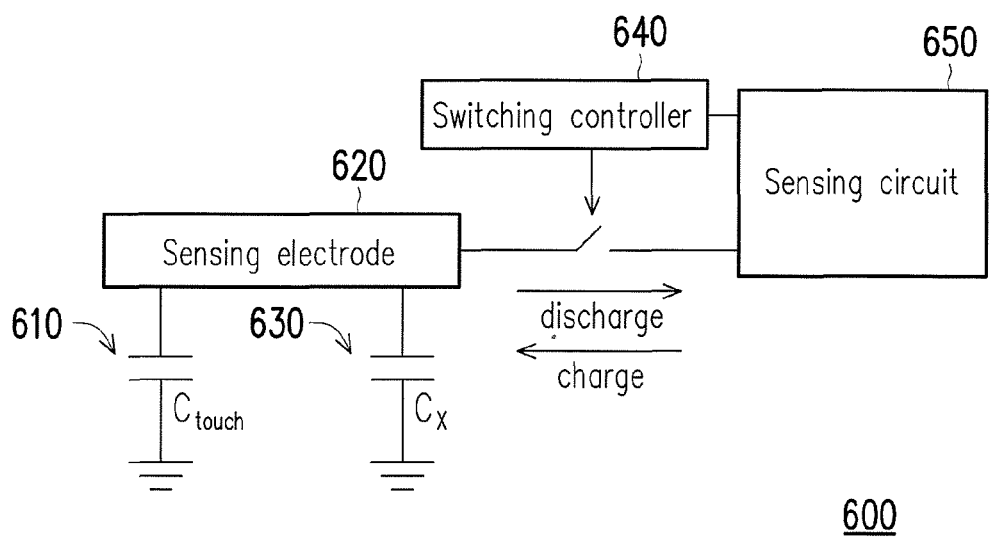
FIG. 6 is a schematic diagram of a relaxation oscillation technique circuit for adjusting a system driving parameter of a touch panel according to an exemplary embodiment of the disclosure.

Referring to FIG. 6, FIG. 6 is a schematic diagram of a relaxation oscillation technique circuit for adjusting the system driving parameter of the touch panel according to an exemplary embodiment of the disclosure. The relaxation oscillation technique circuit architecture 600 includes a capacitor element ($C_{touch}$) 610, a sensing electrode 620, an induction capacitor (Cx) 630, a switching controller 640 and a sensing circuit 650. The relaxation oscillation technique circuit architecture 600 adopts a basic principle of an RC time constant technique, and when the capacitor element ($C_{touch}$) 610 is changed along with a finger touch, a time required for charging or discharging an electrode region is accordingly changed. The change of the capacitor element ($C_{touch}$) 610 can be obtained by measuring the change of the charging/discharging period, and since the capacitor element ($C_{touch}$) 610 is unknown, it is assumed to be the induction capacitor (Cx) 630. Such method has a plenty of variations, which can be used to measure frequency or time, and can operate freely or operate based on a single period. In the exemplary embodiment of the disclosure, the adjustment of the system driving parameter is applied to the design of the relaxation oscillation technique circuit for adjusting the time required for charging or discharging, so as to adjust the induction time.

Figure 7:
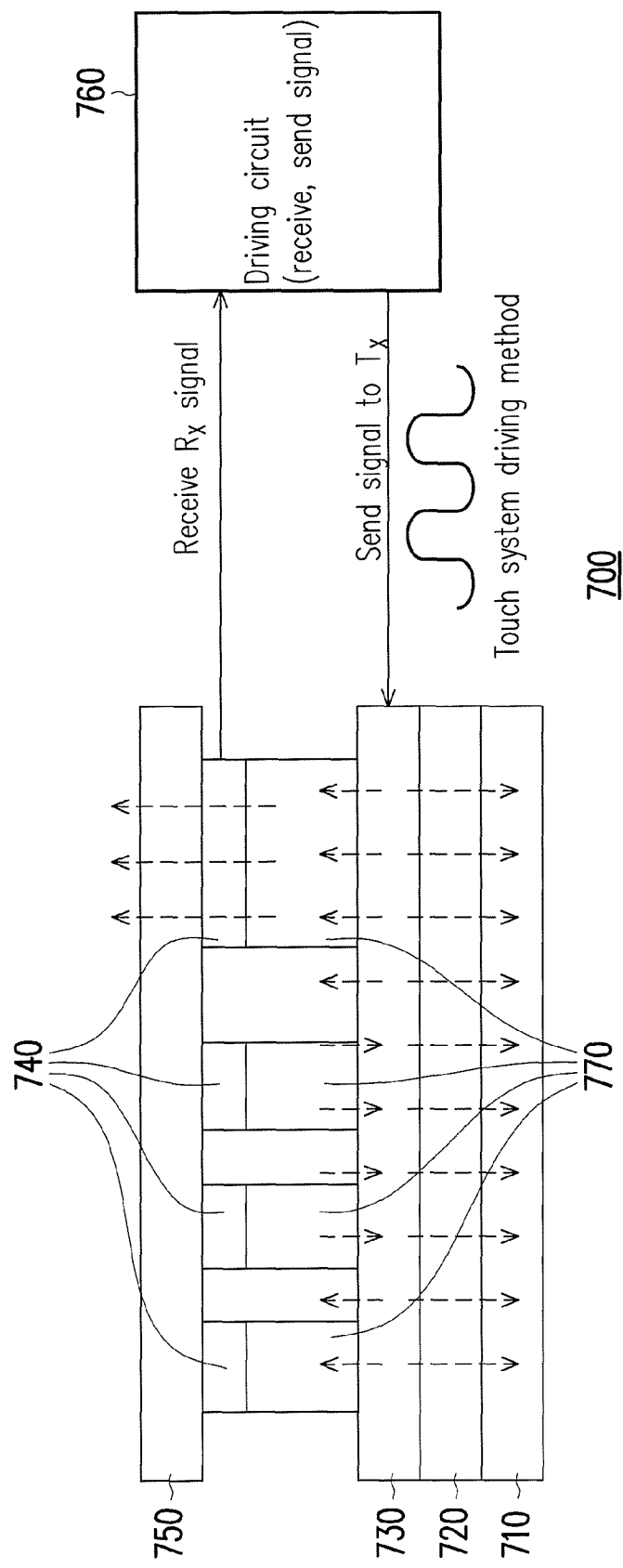
FIG. 7 is a schematic diagram illustrating transmission of a driving signal between a touch display panel and a driving circuit.

Referring to FIG. 7, FIG. 7 is a schematic diagram illustrating transmission of a driving signal between the touch display panel and a driving circuit. The touch display panel 700 includes an active matrix organic light emitting diodes (AMOLED) display panel and a touch panel. In the embodiment, an upper electrode 710 of the AMOLED display panel, a transmitting electrode (TX) 730 and a receiving electrode (RX) 740 of the touch panel, an insulation layer 720 between the display panel and the touch panel, an insulation layer 770 between the receiving electrode (RX) 740 and the transmitting electrode (TX) 730, and a cover layer 750 located above the touch panel are illustrated for explanation. The driving circuit 760 is electrically coupled to the transmitting electrode (TX) 730 and the receiving electrode (RX) 740 of the touch panel. When a touch scan is performed to determine whether an induction event is occurred, the driving circuit 760 transmits a scan signal to the transmitting electrode (TX) 730, and the receiving electrode (RX) 740 transmits a scan result to the driving circuit 760 in response to the scan signal.

Figure 8A:
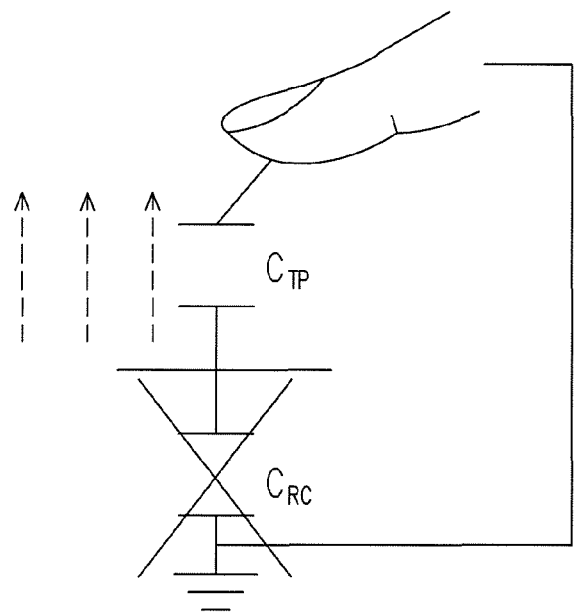
FIG. 8A illustrates a situation that a cross-voltage value of an induced capacitor is avoided to be decreased during operation of an induction driving period as long as a capacitor formed between a sensing electrode and an upper electrode of a display panel is decreased or eliminated.

As described above, the touch display panel (for example, a combination of the AMOLED display panel and the touch panel) becomes more and more thinner, which results in a fact that the capacitor $C_{RC}$ is formed between the sensing electrode and the upper electrode of the display panel, and the cross-voltage value of the induction capacitor $C_{TP}$ is decreased during the operation of the induction driving period, so that it is liable to have a problem of induction error or induction misjudgement. In order to avoid the above situation, referring to FIG. 8A, as long as the capacitor $C_{RC}$ formed between the sensing electrode and the upper electrode of the display panel is eliminated, the situation that the cross-voltage value of the induction capacitor $C_{TP}$ is decreased during the operation of the induction driving period is avoided.

Exemplary embodiments of FIGS. 8B-8F are provided below for describing how to decrease or eliminate the capacitor $C_{RC}$ formed between the sensing electrode and the upper electrode of the display panel in the touch display panel including the AMOLED display panel and the touch panel to achieve valid induction or reduce induction misjudgement, though the disclosure is not limited thereto. In the several exemplary embodiments of FIGS. 8B-8F, a part of the structure of the touch display panel 800 is illustrated for explanation, which includes the upper electrode 810 of the AMOLED display panel, a transmitting electrode (TX) 830 and a receiving electrode (RX) 840 of the touch panel, an insulation layer 820 between the display panel and the touch panel, an insulation layer 870 between the receiving electrode (RX) 840 and the transmitting electrode (TX) 830, and a cover layer 850 located above the touch panel. The several exemplary embodiments of FIGS. 8B-8F are introduced below with reference of the above structure.

Figure 8B:
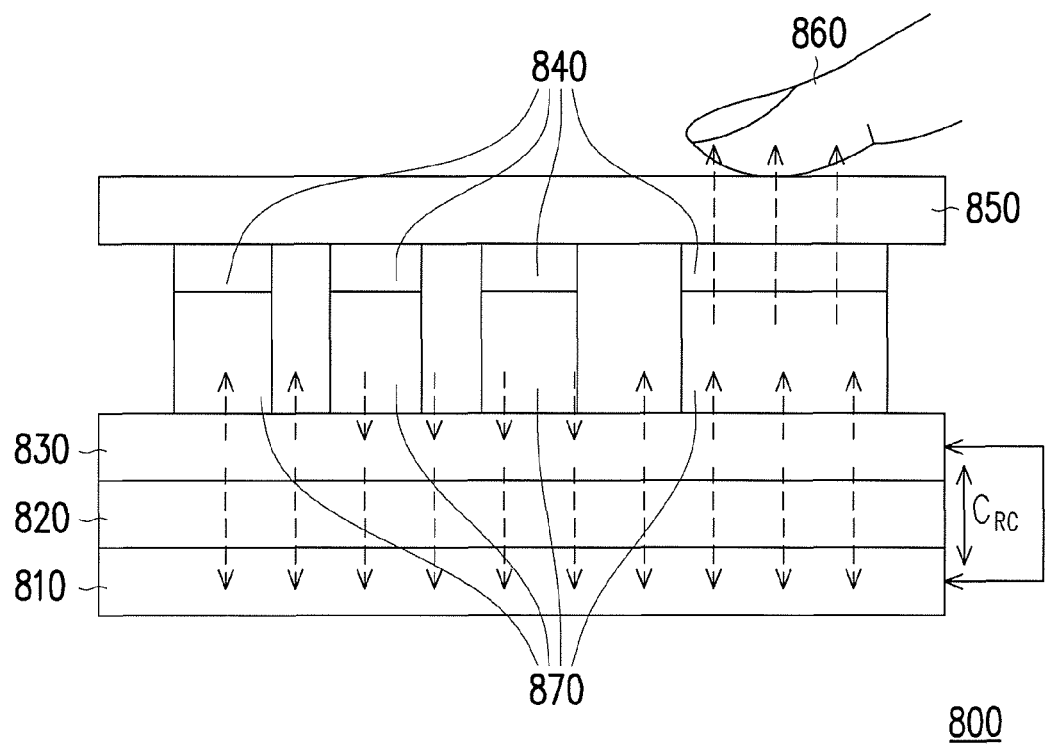
FIG. 8B to FIG. 8F are schematic diagrams illustrating structures achieving valid induction or decreasing induction misjudgement as a capacitor formed between a sensing electrode and an upper electrode of a display panel is decreased or eliminated for a touch display panel.
Figure 8C:
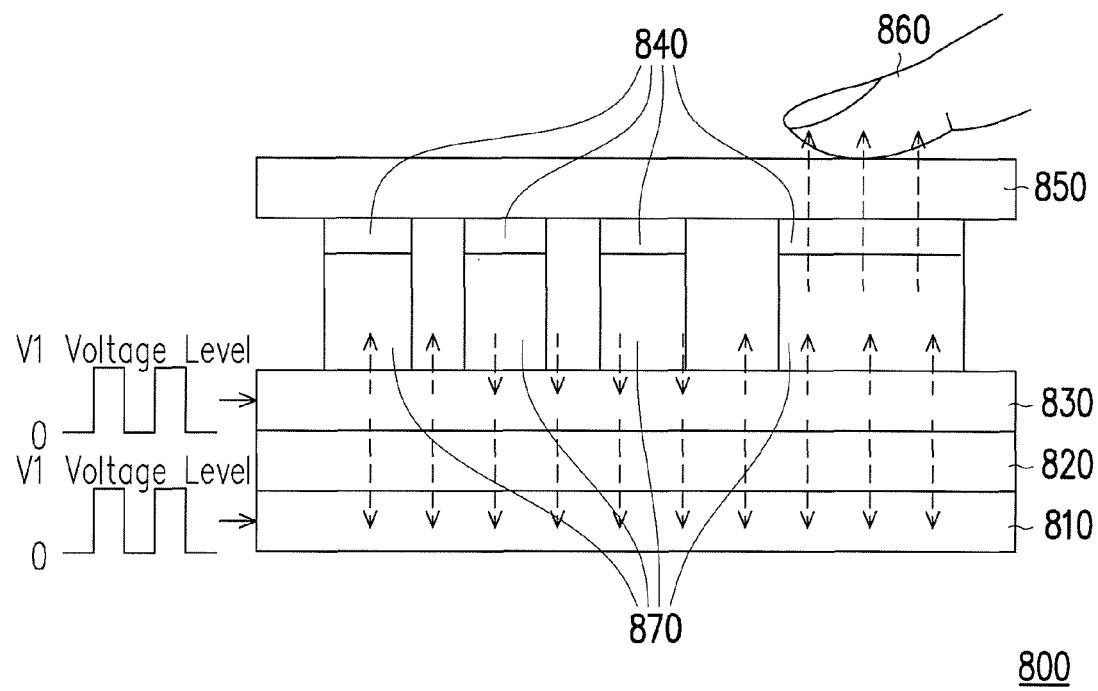

In the exemplary embodiment of FIG. 8B, the upper electrode 810 of the AMOLED display panel is electrically connected to the transmitting electrode (TX) 830, and since the voltage levels of the two electrodes are the same, the capacitor $C_{RC}$ formed therebetween can be effectively eliminated. In the exemplary embodiment of FIG. 8C, when the touch scan is performed, the driving circuit transmits the scan signal to the transmitting electrode (TX) 830, and if the driving signal is a pulse clock signal with a first voltage level V1 as shown in FIG. 8C, the same pulse clock signal can be simultaneously transmitted to the upper electrode 810 of the AMOLED display panel for driving to display, and since the voltage levels at the two electrodes are the same, the capacitor $C_{RC}$ formed therebetween can also be effectively eliminated. In another selective exemplary embodiment, the pulse clock signal of the upper electrode 810 of the AMOLED display panel may also have a voltage level V1, though a clock period thereof is equal to or greater than the pulse clock signal with the voltage level V1 that is transmitted to the transmitting electrode (TX) 830.

Figure 8D:
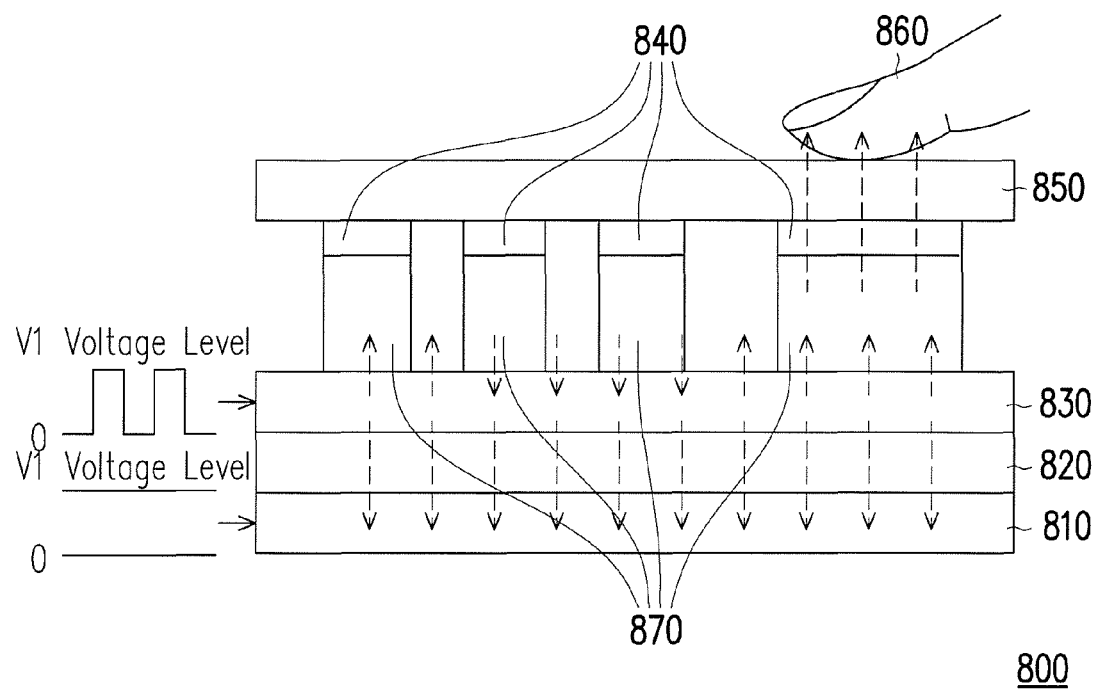

In another exemplary embodiment, referring to FIG. 8D, when the touch scan is performed, the driving circuit transmits the scan signal to the transmitting electrode (TX) 830, and if the driving signal is the pulse clock signal with a voltage level V1 as shown in FIG. 8D, a signal with the fixed voltage level V1 can be transmitted to the upper electrode 810 of the AMOLED display panel, and since the voltage levels at the two electrodes are the same during the touch scan period, the capacitor $C_{RC}$ formed therebetween can be effectively eliminated.

Figure 8E:
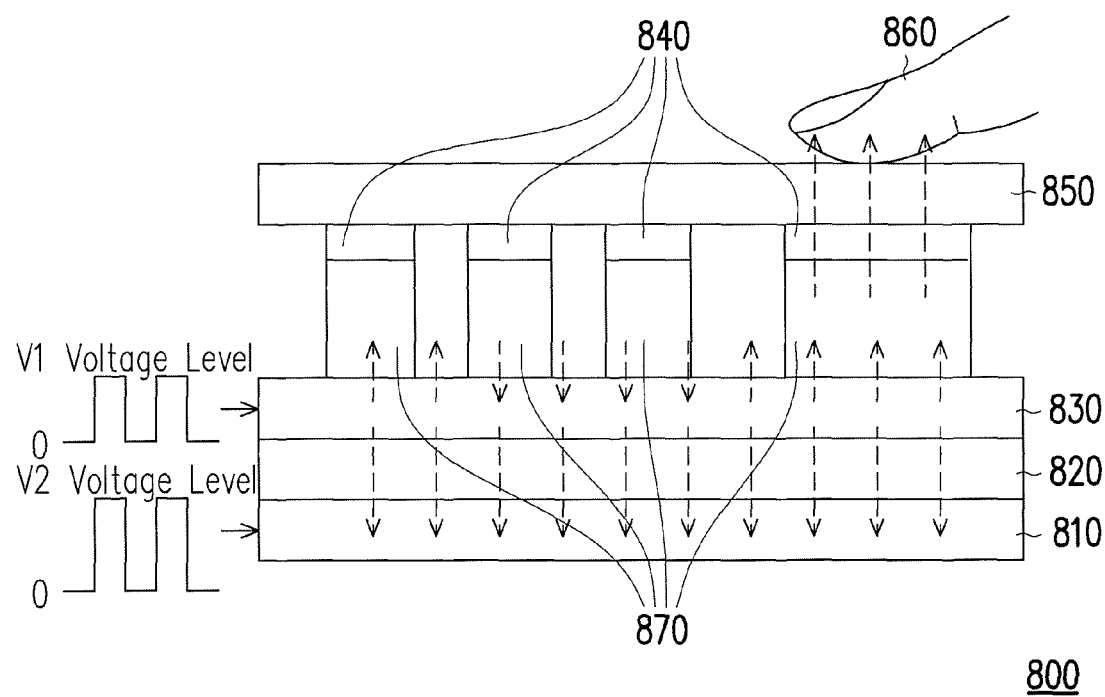

In still another embodiment, referring to FIG. 8E, when the touch scan is preformed, the driving circuit transmits the scan signal to the transmitting electrode (TX) 830, and if the driving signal is the pulse clock signal with the first voltage level V1 as shown in FIG. 8E, a pulse clock signal with a second voltage level V2 that is greater than the first voltage level V1 can be simultaneously transmitted to the upper electrode 810 of the AMOLED display panel for driving to display, and since the voltage level of the upper electrode 810 of the AMOLED display panel is higher than the voltage level of the transmitting electrode (TX) 830 at a same time period, the capacitor $C_{RC}$ formed therebetween can also be effectively eliminated.

Figure 8F:
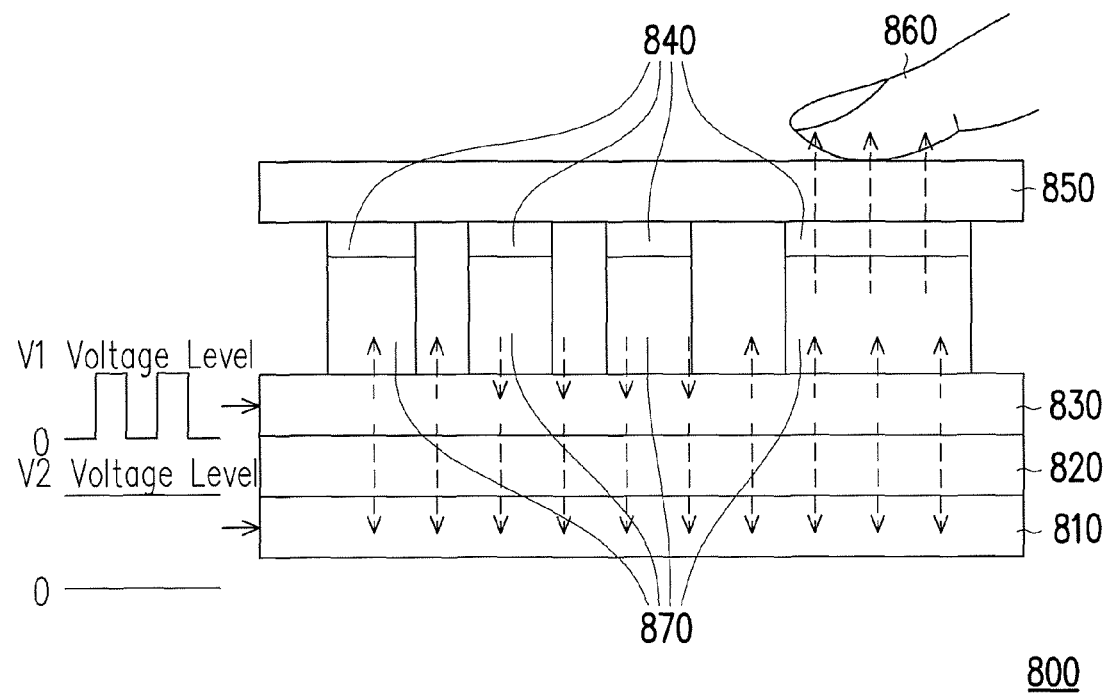

In another exemplary embodiment, referring to FIG. 8F, when the touch scan is performed, the driving circuit transmits the scan signal to the transmitting electrode (TX) 830, and if the driving signal is the pulse clock signal with the voltage level V1 as shown in FIG. 8F, a signal with a second voltage level V2 that is greater than the voltage level V1 can be transmitted to the upper electrode 810 of the AMOLED display panel, and since the voltage level of the upper electrode 810 of the AMOLED display panel is higher than the voltage level of the transmitting electrode (TX) 830 at a same time period, the capacitor $C_{RC}$ formed therebetween can also be effectively eliminated.

The aforementioned exemplary embodiments can be used to effectively decrease or eliminate the capacitor $C_{RC}$ formed between the sensing electrode and the upper electrode on the display panel, so as to achieve valid induction or reduce induction misjudgement. In the exemplary embodiment of FIG. 8B, if the upper electrode 810 of the AMOLED display panel is electrically connected to the transmitting electrode (TX) 830, since the voltage levels at the two electrodes are the same, the capacitor $C_{RC}$ formed therebetween can also be effectively eliminated.

Similarly, in other one or a plurality of exemplary embodiments, if a voltage level of the hand touching the touch panel can be maintained to be the same with or lower than the voltage level of the upper electrode of the AMOLED display panel, the situation of induction misjudgement or error can be effectively mitigated. In a plurality of exemplary embodiments, one or a plurality of equipotential electrodes can be disposed or configured at a side surface, or a back surface (or a back plate) of a handheld electronic device, or at any region that can be touched by user's hand except the display panel, and when a user uses the handheld electronic device, and performs a touch operation, the voltage level of the hand touching the touch panel can be maintained to be the same with or lower than the voltage level of the upper electrode of the AMOLED display panel, so as to effectively eliminate the capacitor $C_{RC}$ formed therebetween. In the exemplary embodiment, the equipotential electrodes may be electrodes applied with the same voltage potential or being maintained at the same voltage level. An exemplary embodiment is provided below for further description.

Figure 9A:
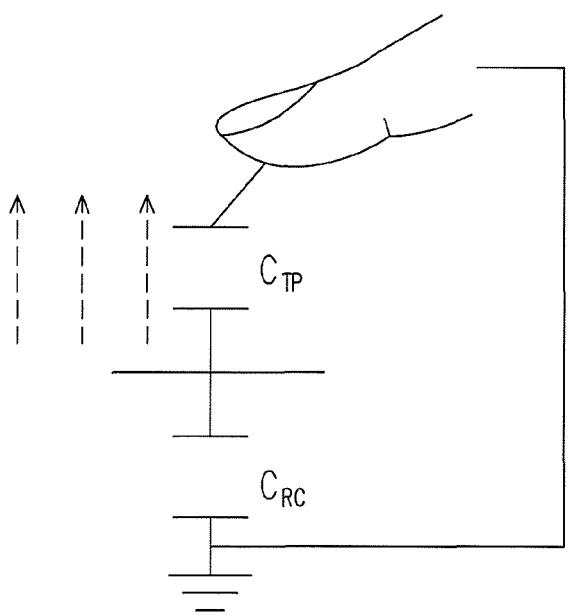
FIG. 9A is a schematic diagram of equalizing a voltage level of user's hand and a voltage level of an upper electrode of a display panel.
Figure 9B:
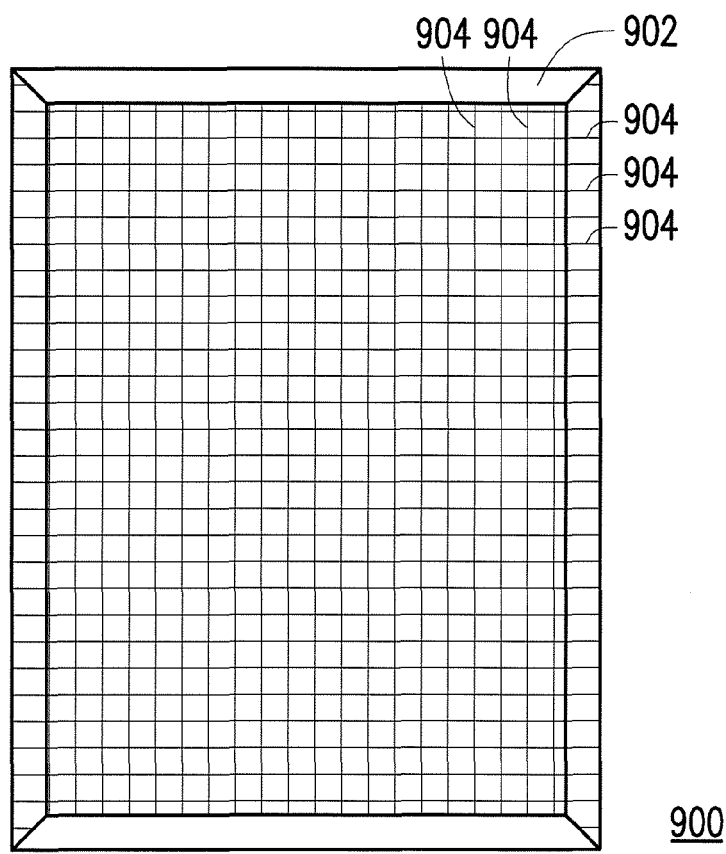
FIG. 9B to FIG. 9D are schematic diagrams illustrating an effect of eliminating a capacitor $C_{RC}$ according to an exemplary embodiment of the disclosure.

Referring to FIG. 9A, if the voltage level of the hand touching the touch panel can be maintained to be the same with the voltage level of the upper electrode of the AMOLED display panel, the situation of induction misjudgement or error can also be effectively mitigated. FIG. 9B is a schematic diagram illustrating an effect of eliminating the capacitor $C_{RC}$ according to an exemplary embodiment of the disclosure. In the exemplary embodiment, an handheld electronic device 900 is provided, and a plurality of interleaving conductive wires or electrodes are designed on a back plate of a casing 902 of a main body of the handheld electronic device 900, which are referred to as equipotential electrodes 904, and the equipotential electrodes 904 receive a signal with a voltage level that is the same with that of the upper electrode of the display panel from the driving circuit. Once the user holds the handheld electronic device 900, and performs a touch operation, the voltage level of the hand touching the touch panel can be maintained to be the same with the voltage level of the upper electrode of the AMOLED display panel.

Figure 9C:
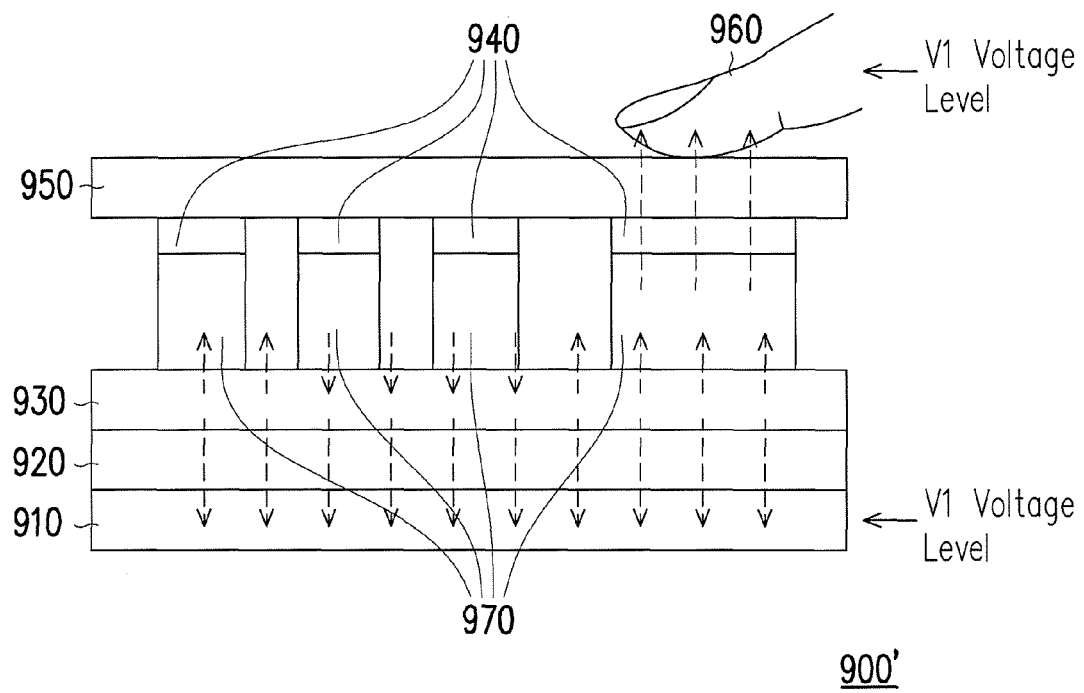

Referring to FIG. 9C, FIG. 9C is a schematic diagram of a structure achieving the effect of FIG. 9A that the voltage level of the hand touching the touch panel is maintained to be the same with the voltage level of the upper electrode of the AMOLED display panel. In the embodiment, for explanation, a part of the structure of the touch display panel is illustrated, which includes the upper electrode 910 of the AMOLED display panel, a transmitting electrode (TX) 930 and a receiving electrode (RX) 940 of the touch panel, an insulation layer 920 between the display panel and the touch panel, an insulation layer 970 between the receiving electrode (RX) 940 and the transmitting electrode (TX) 930, and a cover layer 950 located above the touch panel. Since the back plate of the main body of the handheld electronic device is distributed with the equipotential electrodes 904, voltage levels applied to the hand 960 and the upper electrode 910 of the AMOLED display panel are the same, which are all a pulse clock signal with a voltage level of V1. In this way, the capacitor $C_{RC}$ formed between the hand and the upper electrode 910 can be effectively eliminated.

Figure 9D:
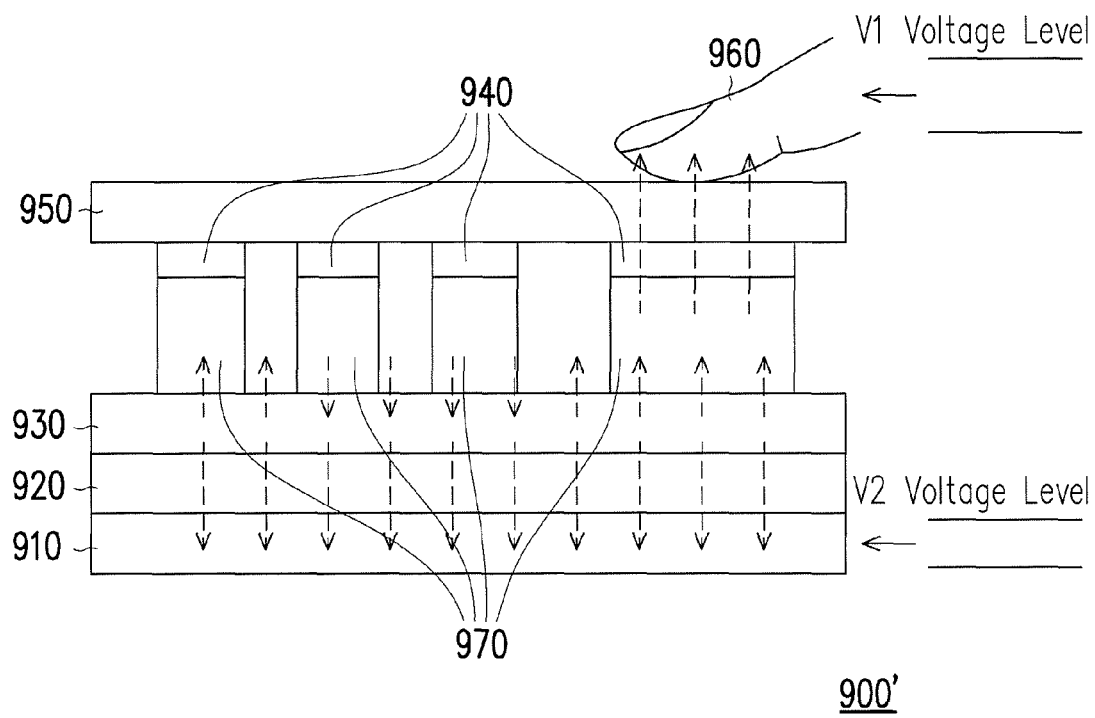

In another exemplary embodiment, in order to effectively eliminate the capacitor $C_{RC}$, an exemplary embodiment of respectively controlling the voltage level of the hand touching the display panel and the voltage level of the upper electrode of the AMOLED display panel is provided, and a structural schematic diagram thereof is shown in FIG. 9D. A method for controlling the voltage level of the hand touching the display panel can be implemented by configuring a plurality of equipotential electrodes on the back plate of the main body of the handheld electronic device, or according to other methods, for example, by configuring a plurality of equipotential electrodes, etc. on a frame of the handheld electronic device, which is not limited by the disclosure. The voltage level applied to the hand 960 is the pulse clock signal with a voltage level of the first voltage value V1, and the voltage level applied to the upper electrode 910 of the AMOLED display panel is the pulse clock signal with the second voltage level V2, and as long as the voltage level V1 is controlled to be smaller than the voltage level V2 during the touch scan period, the capacitor $C_{RC}$ formed between the hand and the upper electrode 910 can be effectively eliminated.

Figure 9E:
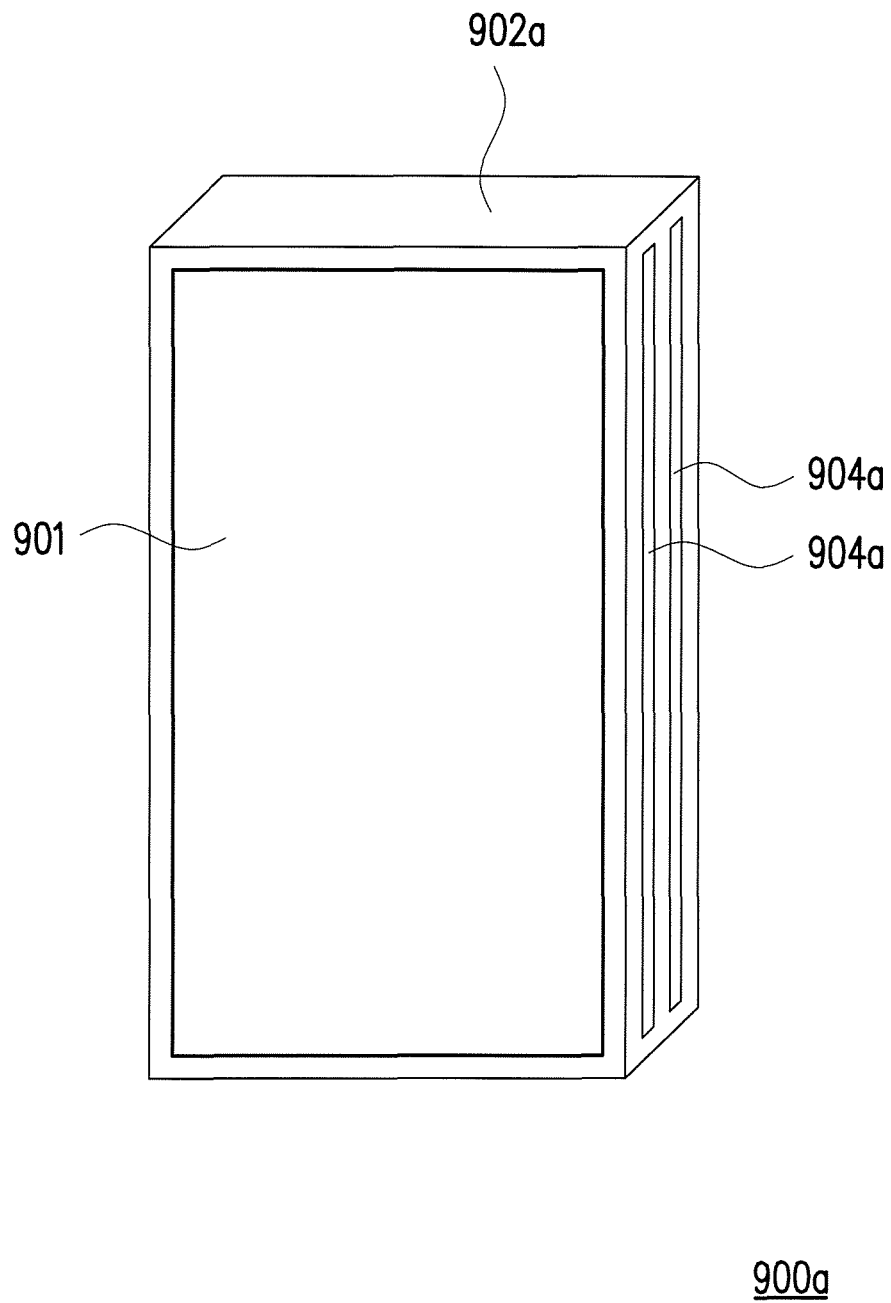
FIG. 9E is a schematic diagram illustrating an effect of eliminating a capacitor $C_{RC}$ according to another exemplary embodiment of the disclosure.

FIG. 9E is a schematic diagram illustrating an effect of eliminating the capacitor $C_{RC}$ according to another exemplary embodiment of the disclosure. In the exemplary embodiment, at least two conductive wires or electrodes are designed on a side surface of a casing 902a of a handheld electronic device 900a, which are referred to as equipotential electrodes 904a, and the equipotential electrodes 904 receive a signal with a voltage level the same with that of the upper electrode of the display panel from the driving circuit. Once the user holds the handheld electronic device 900a, and performs a touch operation, the voltage level of the hand touching the touch panel can be maintained to be the same with the voltage level of the upper electrode of the AMOLED display panel.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A touch sensing method, adapted to a touch display apparatus, wherein the touch display apparatus comprises a display panel and a touch panel, the display panel comprises an electrode layer, and the touch panel comprises a driving electrode layer, the touch sensing method comprising:
    applying a voltage to the driving electrode layer;
    setting a system parameter to determine whether an induction event is occurred, if not, obtaining a sensing voltage, and if yes, obtaining a parasitic capacitance voltage corresponding to the induction event; and
    determining whether a value obtained by subtracting the sensing voltage from the parasitic capacitance voltage is smaller than a threshold voltage,
    if yes, adjusting the system parameter, and determining whether a next induction event is occurred according to the updated system parameter,
    if not, determining whether a variation of the sensing voltage is smaller than a threshold,
    if not, reporting a touch point,
    if yes, adjusting the system parameter, and determining whether a next induction event is occurred according to the updated system parameter.

2. The touch sensing method as claimed in claim 1, wherein a method for adjusting the system parameter comprises prolonging an induction time.

3. The touch sensing method as claimed in claim 1, wherein a method for adjusting the system parameter comprises adjusting a time of an initialization phase in a constant current charge-discharge circuit.

4. The touch sensing method as claimed in claim 3, wherein a method for adjusting the time of the initialization phase comprises prolonging the time of the initialization phase.

5. The touch sensing method as claimed in claim 1, wherein a method for adjusting the system parameter comprises adjusting a time required for charging or discharging.

6. The touch sensing method as claimed in claim 1, wherein the touch panel is attached to a surface of the display panel in an on-cell manner.

7. A touch display apparatus, adapted to execute the touch sensing method as claimed in claim 1, and the touch display apparatus comprising:
    a display panel, comprising an electrode layer; and
    a touch panel, comprising a driving electrode layer.

* * * * *